(12) United States Patent
Rossi

(10) Patent No.: US 8,735,745 B2
(45) Date of Patent: May 27, 2014

(54) DEVICE FOR CONTINUOUSLY WEIGHING A FLOWING BULK MATERIAL EXITING A CONVEYOR

(76) Inventor: Hector Claudio Rossi, Provincia de Santa Fe (AR)

( * ) Notice: Subject to any disclaimer, the term of this patent is extended or adjusted under 35 U.S.C. 154(b) by 407 days.

(21) Appl. No.: 13/103,480

(22) Filed: May 9, 2011

(65) Prior Publication Data

US 2011/0209925 A1 Sep. 1, 2011

(30) Foreign Application Priority Data

Aug. 6, 2010 (AR) .............................. 2010 0102889

(51) Int. Cl.
*G01G 13/18* (2006.01)
*G01F 1/30* (2006.01)

(52) U.S. Cl.
USPC ............................................ 177/16; 177/116

(58) Field of Classification Search
USPC .................................... 177/16, 116–122, 145
See application file for complete search history.

(56) References Cited

U.S. PATENT DOCUMENTS

| | | | |
|---|---|---|---|
| 5,002,140 A * | 3/1991 | Neumuller | 177/16 |
| 5,147,152 A | 9/1992 | Link | |
| 5,230,251 A * | 7/1993 | Brandt, Jr. | 73/861.72 |
| 6,441,321 B1 | 8/2002 | Hebenstreit | |
| 6,640,158 B1 * | 10/2003 | Brandt, Jr. | 700/240 |
| 6,732,597 B1 * | 5/2004 | Brandt, Jr. | 73/861.73 |
| 8,299,374 B2 * | 10/2012 | Brandt | 177/1 |
| 2008/0049546 A1 | 2/2008 | O'Callaghan | |

* cited by examiner

*Primary Examiner* — Randy W Gibson
(74) *Attorney, Agent, or Firm* — Porzio, Bromberg & Newman, P.C.

(57) ABSTRACT

A weighing device for a bulk material conveyor, of the type that is included in the output of a tube for conveying a flow of bulk material, the device conducting the flow through the output and weighing in real time the amount of bulk material passing through the device, with the device comprising a load cell that is connected between a stationary plate and a movable plate, and a rotation sensor that records the revolutions of a rotating reference device that rotates under the effect of the flow of the bulk material passing through the weighing device.

19 Claims, 5 Drawing Sheets

# DEVICE FOR CONTINUOUSLY WEIGHING A FLOWING BULK MATERIAL EXITING A CONVEYOR

BACKGROUND OF THE INVENTION

1. Field of the Invention

The present invention is related to the field of the devices, machines and requirements used for the weighing of bulk material, more precisely the current invention concerns a weighing device that is used in a bulk material conveyer and more preferably in the unloading spout of elevation tubes for grains, seeds and the like, wherein said grains, seeds and the like are elevated in a steady flow by means of a cased worm screw or equivalent mechanism coming, continuously coming out of a deflection collar.

2. Description of the Prior Art

In order to obtain a better understanding of the object and the scope of the current invention, it is convenient to describe the current state of the art in reference to the devices and practices used for weighing during the manipulation of bulk loads, especially when the loading and unloading is done in a continuous manner. A description follows of the various inconveniences that are involved when controlling bulk loads of for example grains, seeds and similar products that are the result of a harvest. These products should be unloaded onto containers or trucks to be transported afterwards, or collected and transported after being extracted from silage bags.

It is known that the manipulation and transportation of bulk material is substantially different from products that are packaged in certain quantities or doses, such as boxes, bags and the like. For that reason, the verification of the weight or load of the bulk material, that for example is loaded onto a transportation truck by an agricultural producer, deserves special attention as ensuring an objective weight measurement generally requires the moving of said trucks onto weighing scales, before and after the loading of the grain, seed or the like.

Some other resources are also used, such portable scales, loading axis scales or even scales that are mounted onto the actual vessels, hoppers or containers. For this purpose, some sort of device is needed that allows for the weighing in real time of the circulating flow that is being transported. In other words, obtaining a dynamic procedure to weigh thanks to a device that could be mounted on the unloading spout of an elevation tube and for the conveying of grains whereby readings can be done in real time of the weight that is being delivered to the hopper, container or bulk truck receiving said bulk material.

It would also be convenient to have a device that does not substantially modify the operating conditions of the elevation tube and conductor of bulk material, avoiding the generation of transitory charges, the use of rotating frames for a transitory containment of the grains, and any type of mobile door that needs to be engaged, hereby interrupting the desired continuous flow. This type of device would allow for an efficient dynamic passage of a continuous circulating stream of bulk material, straight into the mouth of the elevation tube for discharge.

SUMMARY OF THE INVENTION

It is therefore an object of the invention to provide a weighing device for a material conveyor of any type, such as a tubular conveyor, a screw conveyor, an auger, belt conveyor, bucket conveyor, etc. wherein the bulk material is conveyed and the weighing device is capable of weighing the bulk material as the bulk material is conveyed, and wherein the weighing device may be arranged at any desired part of the conveyor.

It is another object of the invention to provide a weighing device for grain conveyors of the type comprising a tube with a screw therein, or auger, that may be applied to a discharge mouth or output of the conveyor, wherein the weighing device may be mounted in replacement of the conventional nozzle or header that conducts the unloading of the grain and/or it may be incorporated in the header during the manufacturing of the grain elevator tube, for continuously weighing the bulk material exiting through the unloading spout.

It is also another object of the invention to provide a weighing device for a spout or header to unload bulk material, that allows to unload said material in a continuous and fluid manner, without significant interferences, permitting to conduct the fluid flow of grain in a convenient manner by means of the weighing device, wherein said weighing device is capable of conducting or directing the exiting and unloading of the bulk material.

It is therefore another object of the invention to provide a weighing device for a spout or header to unload bulk material, which is capable of being adapted to the known grain augers and using the components already present in these grain conveying and elevator devices, such as for example, worm screws or augers for conveying and/or elevating grains.

It is also another object of the invention to provide a weighing device for a unloading spout or header to unload bulk material, that may be included or connected to the output of a tube for conveying and elevating a flow of bulk material, the weighing device being connected to a data processing circuit and an member to display the information, wherein the weighing device comprising a stationary bottom plate, stationary relative to said conveying tube, with an upper movable plate also being provided and above which said flow of bulk material is to be conducted, wherein at least one load cell or weight-sensor member is provided with one end thereof being connected to said bottom plate and another end connected to said upper movable plate, and wherein said data processing circuit is operatively connected to said load cell and to a sensor member for detecting the rotation of the rotating reference member or similar, with the rotating reference member being in contact to said flow of bulk material in order to rotate under the effect of the flow of the bulk material passing through the weighing device, so the rotation speed of said rotating reference member remains directly related to the flow of the bulk material.

It is another object of the invention to provide an improved weighing device to be employed in grain unloading and/or conveying tubes, of the type employed in the loading/unloading of grain from silage bags, grain transportation trucks and the like, wherein said device comprises a header or spout that is compact and capable of adaptation, that may be installed in machines without the need for making costly modifications for receiving said weighing device.

It is yet another object of the invention to provide an improved weighing device wherein the header is designed to improve the reading during the weighing of the continuous flow of grains passing along the tube, and has at least one load cell to measure the flow of grains and wherein a paddle wheel is provided which is connected to the shaft of a rotation-detecting member and said header being closed or covered at its top part to improve the measurement of the grain flow.

It is also another object of the invention to provide a weighing device for a bulk material unloading or conveying tube, the device having a paddle wheel that is rotationally related to the flow of grain or bulk material exiting the unloading tube.

It is a further object of the invention to provide a weighing device for a bulk material unloading or conveying tube or conveyor, having a stationary bottom plate and an upper movable plate located over a load cell mounted between the two plates, and a rotation-detecting member arranged close to a unloading spout or output of said weighing device and said sensor member is operatively connected to a paddle wheel, with the rotating paddle wheel extending transversely to said weighing device, said paddle wheel being adjacent to said upper movable plate which defines a path for the flow of bulk material that is being unloaded and said paddle wheel has a plurality of paddles extending through said path for rotation according to the flow of the bulk material.

It is a further object of the invention to provide a weighing device for a bulk material unloading or conveying tube or conveyor, having a weigher and a deflector plate in or close to an output of the tube or conveyor to comb or level the bulk material or grain before passing over the weigher in order that the grain passes in a compact and uniform manner over the weigher plate, independently of the speed or number of revolutions of an auger or conveying screw that elevates the grain through the tube.

BRIEF DESCRIPTION OF THE DRAWINGS

The present invention is illustrated by way of example in the following drawings wherein.

DESCRIPTION OF THE PREFERRED EMBODIMENTS

As has been mentioned in the prior art section, weighing a bulk product G which exits the outlet of a conveying tube at a certain speed and elevation 1 of for example, an agricultural harvesting machine for grains in bags or silage bags is complicated as said measurement automatically consists of a dynamic process. Although the weight measurement of a continuous grain flow G might seem very interesting and convenient because of the comfort and speed of work, on the other hand it constitutes a considerably problematic technological challenge.

As this is a dynamic process, there are interfering variables that are more difficult to understand compared to a static weighing activity, as is the case for classic scales.

For that reason, and with the objective of theoretically supporting and contributing to the understanding of the correct operation of the weighing device in the three embodiments of the present invention, below follows the description and presentation of FIGS. 1 to 8, but also a theoretical development, expressed in formulas that correspond to the inventive concepts of the present invention, allowing someone who is well-versed in the art to interpret, effectively bring into practice and adequately calibrate the weighing device. Even when the application of the present device in a tube-type auger is referenced, it is worth noting that it can also be applied in other types of transporters for bulk material such as conveyors, mechanical loaders, augers, etc.

Description of the First Embodiment

The dynamic weighing method for this embodiment of the invention is achieved through the development of formulas or theoretical development, the combination of the reading and registration of the weight in real time of the bulk material that is being transported using a configuration or assembly of load cells between fixed and movable plates situated in the outlet of the unloading spout, and using the reading of the rotation sensor member that registers the rotations of the rotating reference member, just like a worm screw, whereby the result is the measurement of the mass quantity unloaded by the weighing device using a recollection circuit for processing and storage of said detector and cell.

The device of the first embodiment is very helpful to the user, as it allows the weight of the bulk material to be established while it is being unloaded through said tube, without the need for a fixed scale of great proportions and very high cost.

Figure 1:
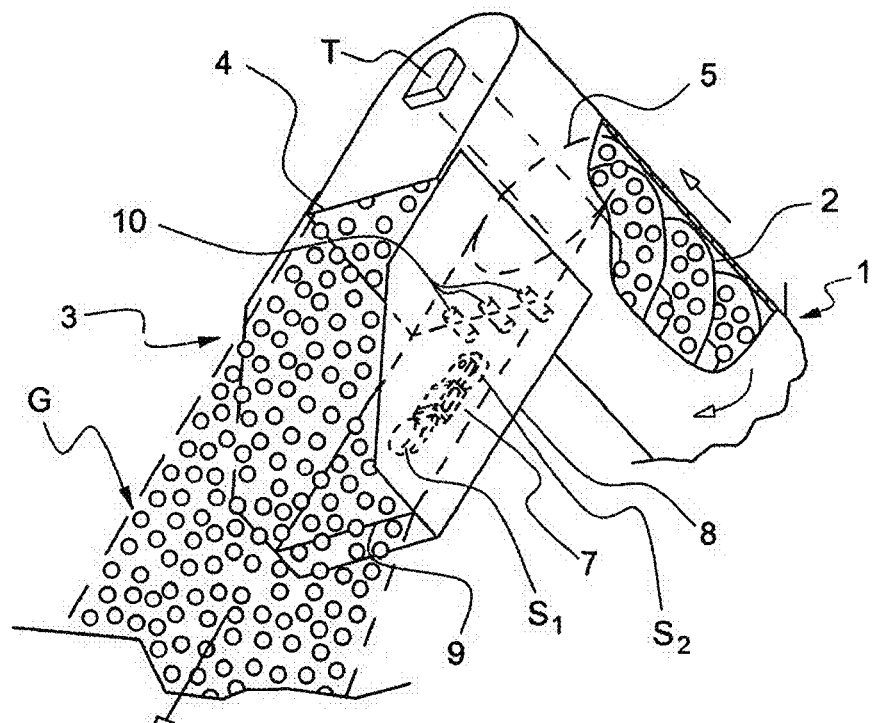
FIG. 1 shows a perspective view of the weighing device according to a first embodiment of the present invention, wherein the upper end of a bulk material conveying and/or unloading tube of continuous flow is observed and wherein a grain elevating worm screw or auger is depicted, as well as a plurality or mass of particles representing the flow of grain passing through said worm screw and exiting the weighing device is shown.

Starting with FIG. 1, the illustration can be observed of the upper part of a piece of equipment for the elevation and unloading of grains which consists of a conveying tube 1, and the bulk material G is elevated through its interior, more particularly conveyed by a worm screw 2 that rotates through motorization, for example by using an electrical, hydraulic or similar engine, which does not appear in the illustration because it is well known in the art.

The grain, seed or bulk material G is then elevated from a hopper, bag or silo or another place for temporary storage (not illustrated for the sake of graphic simplification), to be pushed out laterally through a deflection header 3, which for the purpose of the first embodiment has been illustrated as the weighing device 3 of the first embodiment. A device 3 is then provided that can be attached to or integrated into said conveying tube 1, which will be intermediately positioned at the grain outlet G of the conveying tube and elevation 1.

In said FIG. 1 we can therefore observe that the device 3 can be made of a tubular frame of flat walls even when this is not a limitation and can be made of curved walls. The frame or device 3 has a bottom plate 8, fixed against tube 1. Said plate 8 is united, connected or laterally confined by a pair of side plates that are similar to the ones of conventional outlets. Said stationary bottom plate 8 is placed at a distance from an upper movable plate 9, generally at a distance large enough to house a load cell 7, and a plurality of spacers 10 that help to keep the distance between plates 8 and 9, but that do not interfere with the movement of the upper movable plate 9. Whenever the stationary bottom plate is mentioned, it should be understood that this plate can be added or it can be the bottom of the device or tubular frame, forming part of the device itself or being added to it using any known fixation method.

Said upper movable plate 9 is kept in position so it does not leave the interior of the device 3, but nonetheless it can carry its own weight and any weight that is put on said movable plate 9, deforming said load cell 7.

For this purpose, one of the extremities of said load cell 7 is connected to said stationary bottom plate 8 and its second end is connected to said upper movable plate 9, as illustrated in the Figures.

Said load cell 7, or even more than one load cell can then be connected to a decoder or data processing circuit C and using said operational connection, a signal can be established that is proportional to the weight that rests on the plate.

Nevertheless, it is not possible to consider nor to realize weighing and calibration of the same type that someone who is well-versed in the arts would apply to a common static scale, as weighing a dynamic load that is circulating is not the same as weighing a static load.

Consequently, there are conditions that are inherent to the type of application and dynamic operation (load continuously circulating and falling) that in certain cases prevent the application of a simple calibration of a traditional scale, therefore it is not possible to determine the necessary distribution of components, plates and load cells that ensure the continuous weighing of circulating bulk material G. However, this inconvenience is overcome by the device of the present invention and the calibration that is described below.

Theoretical Support of the Operation and Setting of the Device of the First Embodiment As mentioned before, because of the dynamic nature of the required weighing, and the fact that the load cannot statically rest on any type of traditional scale, it is necessary to ensure the assembly and calibration of a weighing device 3 in such a way that the weight of the circulating material can be registered in order to determine the total weight of material G that has been transferred by the grain elevating equipment.

Initially, the instantaneous mass flow rate that passes through the section of outlet 5 and consequently through outlet 4 of tube 1 is calculated.

In order to calculate differentially, we take said mass flow rate as a differential expression and obtain:

$$q_m = \frac{dm}{dt} \quad \text{(Formula 1)}$$

Where;
m=mass (Kg.)
t=time (s)
$q_m$=grain mass flow rate (Kg./s)

Thereby, the moving flow of grains G will present an exit speed through said outlet 4 that is given by:

$$v_{grano} = \frac{dl}{dt} \quad \text{(Formula 2)}$$

Where;
Vgrano=speed of the grain (m/s)
l=length traveled (m)
t=time (s)

From the combination of (formula 1) and (formula 2) a replacement of variables is obtained, as shown below:

$$q_m = \frac{v_{grano} \cdot dm}{dl} \quad \text{(Formula 3)}$$

As the flow rate has been defined in function of the grain flow speed "$V_{grano}$", we now obtain the expression of said "$V_{grano}$".

Considering that device 3 will work with an inclination of the upper movable plate of for example 60°, a speed component will be produced as the result of the fall onto a inclined plane.

On the other hand, a proper exit speed exists as a result of the delivery member of said grains, in other words the speed provided by the worm screw 2 itself or an equivalent delivery member. Additionally, although the worm screw 2 has been illustrated and described as an elevation and delivery member of grains G, other elevation and delivery members can be used without any inconvenience, provided that a continuous flow of grains G comes out the outlet 4 and goes through the device of the first embodiment 3.

Speed Component of the Grain Due to Gravity

As the device 3 generally adopts an inclination of the outlet of grain G of approximately 60° from a horizontal line, a partial component of the total exit speed of the grain "$V_{grano}$" will correspond to a drop speed over an inclined plane, due to the gravity that works on the grain G, as a result of which we are presented with the following formula for a drop over an inclined plane:

$$g \cdot \sin 30° \cdot \delta m = \delta m \cdot \dot{v}_{grano} + \mu \cdot g \cdot \cos 30° \cdot \delta m$$

Where;
g=acceleration of gravity (m/s²)
δm=is the differential mass of the grain (Kg.)
v=is the speed that this mass reaches
μ=is the coefficient of dynamic friction Furthermore, it is assumed, without introducing significant discrepancies and verifiable in practice, that factors such as viscosity do not play a role and can be disregarded compared to other values.

Solving the variable "$V_{grano}$":

$$\dot{v}_{grano} = g \cdot \sin 30° \cdot \left(1 - \frac{\mu}{\tan 30°}\right) \quad \text{(Formula 4)}$$

By integrating (formula 4) we obtain a new expression of the formula:

$$v_{grano} = g \cdot \sin 30° \cdot \left(1 - \frac{\mu}{\tan 30°}\right) \cdot t + v_0 \quad \text{(Formula 4)}$$

$$v_{grano} = k \cdot t + v_0$$

Where;
k=calibration constant
t=fall time of the grain on the ramp (s)

Speed Component of the Grain Due to the Conveying and Elevation Member of the Grain Now we are calculating the initial delivery speed of the grain "$V_0$", as a result of the extraction screw 2 only. This speed is given by:

$$v_0 = k \cdot p \cdot f \quad \text{(Formula 5)}$$

Where;
p=passing of the screw (m) or (mm), in agreement with the dimensional units adopted in the formula;
f=the rotation frequency taken by the rotation or speed transducer, for example (Hz) and/or convenient unit such as (rpm); and
k=area adjustment constant, in order to contemplate the area difference between outlet 5 of the screw and the area of the resulting grain flow G that passes through the middle of the weighing.

Therefore, the fact that the speed of the grain flow G is proportional to the exit speed through section 5 of the extraction tube's outlet 1, is taken into account. From the combination of (formula 4) and (formula 5) we obtain:

$$v_{grano} = k_1 \cdot p \cdot f + k_2 t \quad \text{(Formula 6)}$$

Where;
p=passing of the screw (m) or (mm), in agreement with the other measurement units
f=the amount of rotations per unit of time (Hz) of (rpm), etc.
$k_1$ and $k_2$=calibration adjustment parameters.

By integrating (formula 6) in terms of time "t", we obtain the distance of path "d":

$$d = k_1 \cdot p \cdot f \cdot t + \frac{k_2}{2} t^2 \quad \text{(Formula 7)}$$

The average travel time of the grains G is obtained by removing time "t" from the (formula 7), taking "d" as "$\Delta l$" of the weighing zone, i.e. the weighing length of the upper movable plate 9, and dividing by two, we obtain:

$$t_{medio} = F(f) \quad \text{(Formula 8)}$$

We can observe that "$t_{medio}$" only depends on "f" as a variable, and that the speed "$V_{grano}$" also only depends on "f". Consequently, "f" is a value that for example can be measured in (rpm), and can be interpreted by a data processing circuit C through the reception of a periodic pulsing signal, and multiples and divisors of said periodic pulsing signals can also be read and interpreted provided that they are related to the flow of bulk materials, as for example said worm screw does. Therefore, said worm screw 2, particularly for the embodiment of FIGS. 1 and 2, will function as a rotating reference member, as its rotation frequency is related to the circulating flow. This way, as will be explained further below, any rotating reference member 2, 11, which allows, for example using a transducer T, to be detected or read by a data processing circuit C, to determine its rotation frequency, can be easily used for the purpose of the present invention. In particular, and only for illustration purposes, a generic transducer is indicated with reference T, which has the capacity of reading the rotation speed or number of rotations of the worm screw 2. As a result, it becomes understandable that any rotation detecting member T of this rotation reference can be used for the purpose of the first embodiment.

Below we proceed to approach the average speed of the grain G by using a Taylor polynomial, and we obtain:

$$v_{grano} = C_0 + C_1 \cdot f + C_2 \cdot f^2 \quad \text{(Formula 9)}$$

Next, (formula 9) is replaced in formula 3, upon which the following equivalence is obtained in (formula 10):

$$q_m = C_0 \frac{dm}{dl} + C_1 \cdot f \frac{dm}{dl} + C_2 \cdot f^2 \frac{dm}{dl} \cong$$

$$C_0 \frac{\Delta m_{placa}}{\Delta l_{placa}} + C_1 \cdot f \frac{\Delta m_{placa}}{\Delta l_{placa}} + C_2 \cdot f^2 \frac{\Delta m_{placa}}{\Delta l_{placa}}$$

Where;
"$\Delta m_{placa}$"=The weight during a reading of A/D (Analog/Digital); and
"$\Delta l_{placa}$"=Useful length of the weighing plate 9, where the weighing plate 9 is the plate that enters in contact with the grain G while it is exiting after having traveled through device 3.

This is perfectly valid if the flow rate is kept relatively constant while the flow travels over "$\Delta l_{placa}$", a situation that is obtained perfectly in the real world by keeping screw 2 or the delivery member working during its continuous work cycle or in function mode.

Now, we can use the (formula 10) to integrate it in the initial time function "$T_0$" and the final time function We obtain the calculation of the total mass:

$$M = \int_{T_0}^{T_f} C_0 \frac{dm}{dl} + C_1 \cdot f \frac{dm}{dl} + C_2 \cdot f^2 \frac{dm}{dl} dt \quad \text{(Formula 11)}$$

Where;
M=Total unloaded mass (Kg.).
"$dm_{placa}$"=mass differential during a conversion of A/D; and
"$dl_{placa}$"=length differential of the weighing plate 6.

Consequently, by replacing the integral of the (formula 11) by a discrete sum, we obtain:

$$M_{sup} = \sum_{n=0}^{2} \frac{C_n}{\Delta l_{Balanza}} \cdot \sum_{i=0} f(t_i)^n \cdot \Delta m_{Balanza}(t_i) \cdot \Delta t \quad \text{(Formula 12)}$$

$$M_{inf} = \sum_{n=0}^{2} \frac{C_n}{\Delta l_{Balanza}} \cdot \sum_{i=0} f(t_{i-1})^n \cdot \Delta m_{Balanza}(t_{i-1}) \cdot \Delta t \quad \text{(Formula 13)}$$

Where;

$M_{sup}$=Maximum (supreme) value of the mass $M_{inf}$=Minimum (inferior) value of the mass In order to sufficiently minimize the discrepancy or truncation error caused by the discrete sum, the semisum is taken:

$$M = \sum_{n=0}^{2} \frac{C_n \cdot \Delta t}{2 \cdot \Delta l_{Balanza}} \cdot \sum_{i=0} f(t_i)^n \cdot \Delta m_{Balanza}(t_i) + f(t_{i-1})^n \cdot \Delta m_{Balanza}(t_{i-1}) \quad \text{(Formula 14)}$$

AND by correlating the constants as equivalents of said calibration constants, we obtain:

$$M = \sum_{n=0}^{2} k_n \cdot \sum_{i=0} f(t_i)^n \cdot \Delta m_{Balanza}(t_i) + f(t_{i-1})^n \cdot \Delta m_{Balanza}(t_{i-1}) \quad \text{(Formula 15)}$$

Where;

$k_n$=three adjustable calibration constants at the time of the calibration of the device;

f=the reading in (rpm) of the rotation per minute sensor that is installed in screw 2; and Δm=The reading of the load cells 7 for each conversion of A/D of the equipment at the reading time "i".

Consequently, it is observed that this theoretical development does not only conveniently support the first embodiment, but it has also shown in practice that it will adapt in a surprisingly exact manner to the readings and weighings of grains G. This way, the readings that are obtained on device 3 of the grain G that is continuously circulating over the upper movable plate 9 allow us to obtain as a result the measurement of the total mass of grains G that is unloaded.

The calibration of device 3 is done by unloading three different quantities of grain G mass through device 3. If "$S_{mn}$" is each one of the summations and "$M_m$" the objective values measured in reality in each one of the calibration charges, and where the subindex "m" indicates the calibration weighing number, it is possible to obtain the calibration of device 3 by resolving the following system of equations:

$$\begin{pmatrix} S_{00} & S_{01} & S_{02} \\ S_{10} & S_{11} & S_{12} \\ S_{20} & S_{21} & S_{22} \end{pmatrix} \begin{pmatrix} k_0 \\ k_1 \\ k_2 \end{pmatrix} = \begin{pmatrix} M_0 \\ M_1 \\ M_2 \end{pmatrix} \quad \text{(Equations system 16)}$$

Typical Values of Working with an Extractor Machine for Extraction of Grain from a Silage Bag:

Taking the typical case of a silage bag extractor with a worm screw, we have the rotation frequency or speed of the screw or delivery member being f=320 rpm; the exit speed of the grain is v=2 m/s; and the exit mass flow of the grain is $q_m$=50 Kg/s. Therefore, on a plate of 800 mm long, there will be a presence of approximately 19 Kg. of grains G on the weighing plate 9, as a result of which it will be convenient to mount a weighing plate 9 with a total weighing value of approximately 30 Kg.

A similar calculation reasoning is applicable in order to determine the capacity of the load cells that should be placed in agreement with the design variables.

Measurement of the Total Mass after a Certain Period of Unloading

Having provided the convenient and sufficient theoretical support for someone who is well-versed in the art to understand, it is observed that said development is intimately related to the configuration of the weighing device 3, which comprises an upper movable plate 9, connected to a load cell 7, for example by means of a union or support member $S_1$, while said load cell 7 is also connected to the stationary bottom plate 8 at its opposing end, by means of for example another support or union $S_2$. Especially in the illustrated figures, we can observe an assembly of load cell 7 which is preferably lagging in alignment with supports $S_1$ and $S_2$, thus allowing to conveniently use the length of load cell 7 and minimize the distance between the plates while allowing a better deformation of the load cell 7 itself.

This way, the grain G that is circulating as a continuous flow over said upper movable plate 9 will have the capacity of applying weight according to the theoretical deduction before it is developed, thus allowing the application of the calculation deductions that were obtained using (formula 15) for the device of the first embodiment. It is worth noting that, once the constants (generally denominated as "k") are calibrated, an adequate data processing circuit C will allow for the capture, by means of a sensor or transducer, of the revolutions per minute, crossings per second, or speed of rotation of a rotating reference member 2, 10 or equivalent, among others. In combination the periodic reading of the weight on said upper movable plate 9 will be done, using said at least one load cell 7.

Figure 2:
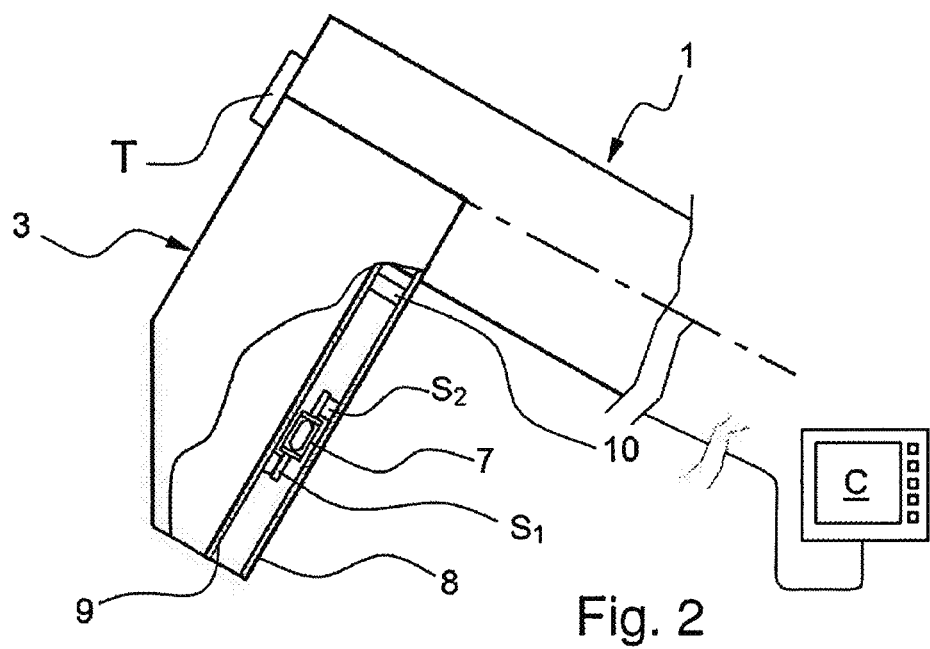
FIG. 2 shows a partial lateral cross section view of the weighing device of the first embodiment, wherein said device is mounted onto the outlet of a bulk material elevator tube and wherein a generic illustration of a data processing circuit is provided in connection to a generic device with keys and a screen.

In the particular case of the FIGS. 1 and 2, the rotating reference member can be the worm screw 2 itself, as its rotation is directly associated with the determined flow of grains G, but any other rotating reference member can be assembled in the device 3 or outside of it with the objective of providing a proportional reading of the grain G flow. Consequently, we observe that, for example; both said worm screw 2, and another rotation reference member that comes into contact with the grain and rotates proportionally to the circulating flow, can be used for the purpose of the device of the first embodiment.

As a result, said data processing circuit C, after having been adjusted according to the adequate values of constants "k", will perform the reading of the rotating reference member 2 or 10 or similar and the periodic reading (Analog/Digital) of the load cell 7 itself allowing for the calculation and display, for example on a screen or any other type of register, of the total mass of grain G that has been circulating.

Figure 3:
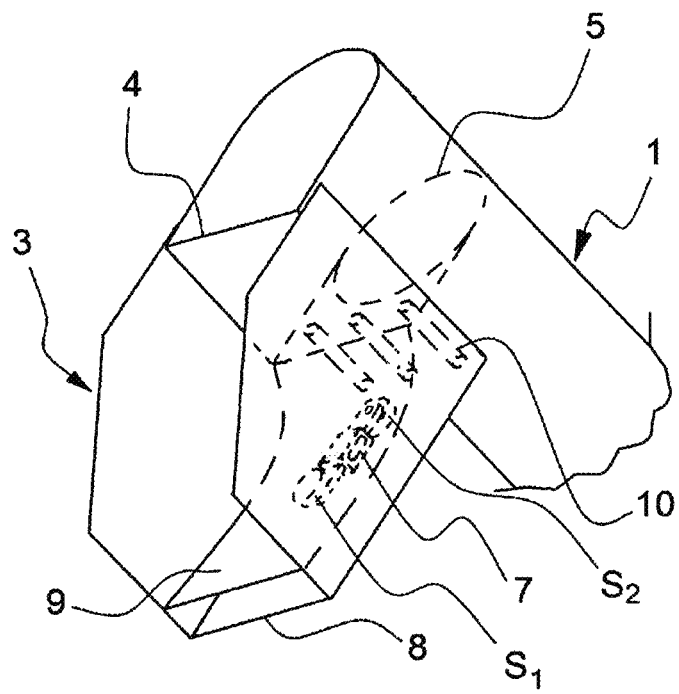
FIG. 3 shows a perspective view of the upper end of a grain elevator, corresponding to the first embodiment of the invention, wherein a variation in the design of the upper movable plate is provided, thus allowing the reference rotating member to adopt the form as shown in FIG. 4, namely a device having radial rotating paddles or blades.
Figure 4:
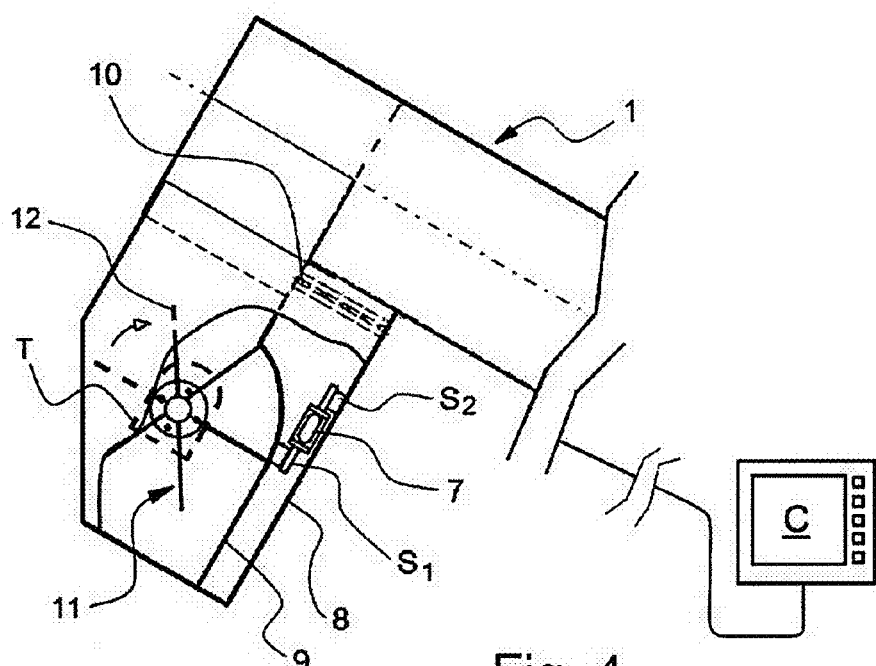
FIG. 4 shows a partial lateral cross section view of the device according to the first embodiment of the invention, based on the design of the upper movable plate of FIG. 3, also showing the rotating radial paddles which are capable of operating as a reference rotating member.

In order to better exemplify the concept and use of the rotating reference member, FIGS. 3 and 4 are provided, to be explained together with FIGS. 1 and 2, where the rotating reference member 11 is now made up of a rotor of uniformly distributed radiant paddles 12, where the volume between two of said paddles 12 at a given moment is confined precisely against for example the plate 9, whereby it is necessary that said upper movable plate 9 accompanies the development of the movement of the paddle assembly 12, which presents a curved portion near the output of tube 1. It is worth noting that said curved portion of said upper movable plate 9 extends concentrically to a rotary shaft of said rotating radiant paddles 11 and in the tangential space comprised in between two successive paddles 12.

Additionally, another type of rotating reference member can also be incorporated equivalently, and in agreement with what has been described in the current descriptive memory, it is understood that some sort of rotation sensor T, revolutions sensor, rotational transducer, inductive motion sensor, etc. will then allow for an electronic communication to the data processing circuit C, of the rotationary position or the amount of rotations of said rotating reference member 2 or 11 or equivalent. While the rotating reference members are defined as being in contact with the flow of bulk material this includes that the contact may be physical, or electromagnetical or optical and the like whereby the rotating reference member is a reference of the flow of the grain.

Said data processing circuit, operationally connected to the rotation sensor member T and said load cell 7 of device 3, will perform the logic of calculation based on the cited theoretical development and will allow for a reliable and secure reading to be obtained of the mass quantity of bulk material G that is unloaded.

Description of the Second Embodiment

As a result of the constant evaluations of said device of the first embodiment, it was observed that the costs and risks of the installation could be reduced if the weighing device were arranged completely inside the mouth or header, thus avoiding any modifications or alterations for adaptability to an unloading machine for bulk material.

Thanks to a continuous development it has been possible to improve said weighing device or the weighing device corresponding to the first embodiment, as a loss of material was detected between the paddle or most external periphery of the helix of said worm screw and the wall of the conveying tube, as a result of the constant analysis and testing. The cause of this lies in the fact that the size and humidity of the bulk material may vary, and the material slides into said separation. The inventors have therefore observed a loss in precision that varies approximately 10%. Said loss established that the rotation sensor member that measures the speed of said worm screw in the main application may be removed and placed elsewhere in the mouth to directly sense the flow of bulk material that is unloaded, reducing the amount of equations that is used in the first embodiment and increasing its precision.

Figure 5:
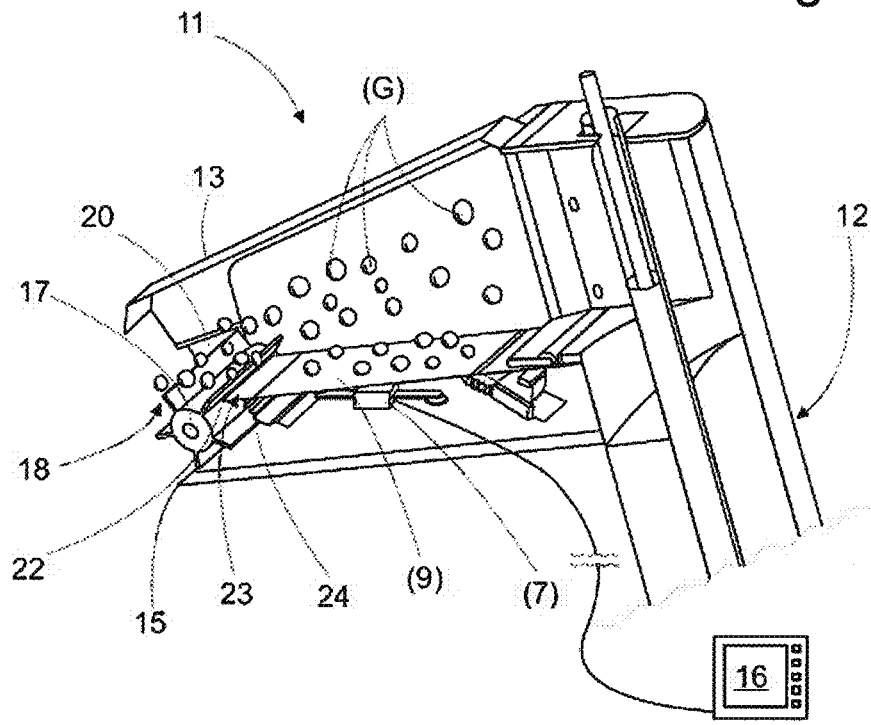
FIG. 5 shows a partial perspective cross section view of the weighing device according to a second embodiment of the invention, wherein the grain unloading spout is depicted in a cross section, a paddle wheel and a load cell can also be seen.
Figure 6:
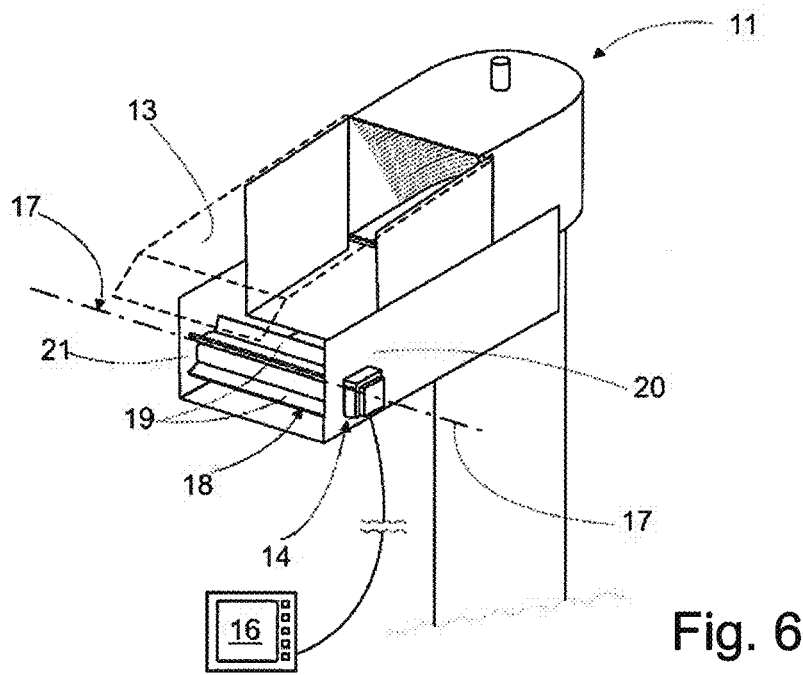
FIG. 6 shows a top plan view of the weighing device of the second embodiment, wherein the paddle wheel is shown mounted through the side plates of said device, the rotation sensor member are shown connected to the data processing circuit.

In FIGS. 5 and 6, which illustrate the second embodiment of the invention, the same reference numbers have been used as in FIGS. 1 to 4 to indicate the same common parts; and new reference numbers have been used for new parts that make up the second embodiment.

The improvements that have been developed in the second embodiment of the present invention consist of the sensor member 14 being arranged close to a discharge output 15 of said weighing device 11 and said sensor member 14 is operatively connected to a paddle wheel 18, which transversally passes through weighing device 11, said paddle wheel 18 being arranged adjacent to said upper movable plate 9 which defines a path for the flow of bulk material being uploaded and that said paddle wheel has a plurality of paddles 19 extending through said path for rotation according to the flow of the bulk material.

This way, the header's reading of the continuous flow of grain through the tube is improved and said header is covered from above by a closing plate to improve the stream or flow measurement.

Said paddle wheel is connected to the axis of a rotation sensor member and is rotationally related to the stream or flow of grain or bulk material coming out of the unloading tube.

More particularly, according to the second embodiment that can be observed in FIGS. 5 and 6, a deflection header 11 is connected to an unloading tube 12, which has a worm screw which has not been illustrated, that can be like the one in the first embodiment. Said header has a plate 13 that covers or closes off the header in order to preferably generate an area that provides protection from the wind. Said header 11, for the purposes of the second embodiment, has been illustrated as the weighing device 11 itself of the second embodiment.

As has been said before, said weighing device 11, because it is closed off with plate 13, receives no interference from the wind regarding the measurement and reading of said weighing device.

Unlike the first embodiment, which references the fact that the rotation sensor member is arranged so it can preferably measure the rotations of said worm screw, in the weigher device 11 of the second embodiment, a rotation sensor member 14 is placed in the section that is close to the outlet or mouth 15 of the bulk material, resulting in a more realistic reading of the grain speed and therefore the invalidity of one of the terms of the formula (15) of the first embodiment. This way, a new formula is provided, applicable to the theoretical development described in the previous embodiment.

The sensor member 14, which preferably is a rotary transducer, is connected to a data processing circuit 16, of similar characteristics and properties as the data processing circuit mentioned in the previous embodiment. In turn, the rotation sensor means 14 is connected to an axis 17 of a paddle wheel 18. Said paddle wheel has blades or paddles 19 and those are arranged perimetrically around said shaft and are preferably made of a metallic material, this material not being a limiting factor, as the paddle wheel can be made of any material selected from stainless steel, carbon steel with anticorrosive coating, or other plastic or polymeric materials with similar characteristics.

Said paddle wheel 18 travels the weighing device or header transversally, whereby one of its extremities is assembled on a side plate 20 and the other end on another opposite plate 21 which form both sides of said weighing device 11. Preferably, said paddle wheel 18 is arranged on the exit end of said upper movable plate 9 and more preferably associated with an end 22 of an intermediary panel 23, wherein said intermediary panel 23 has another end that is directly associated with the upper movable plate 9 mentioned in the previous embodiment. It is worth noting that the separation space between the intermediate plate and the movable plate or the paddle wheel is neglectable and panel 23 could be left out. As a matter of fact, in FIG. 6 an alternative is illustrated without panel 23.

Improvements in the Theoretical Support of the Operation and Setting of the Device of the First Embodiment In the first embodiment, a plurality of formulas is developed that calculate the weight and which will not be referenced, as it is merely necessary to indicate that the second embodiment modifies the development from formula 15 onwards. Thus, formula 15 of the first embodiment expresses the following:

$$M = \sum_{n=0}^{2} k_n \cdot \sum_{i=0} f(t_i)^n \cdot \Delta m_{Balanza}(t_i) +$$

$$f(t_{i-1})^n \cdot \Delta m_{Balanza}(t_{i-1})$$

$$M = \sum_{n=0}^{2} k_n \cdot \sum_{i=0} f(t_i)^n \cdot \Delta m_{Balanza}(t_i) +$$

$$f(t_{i-1})^n \cdot \Delta m_{Balanza}(t_{i-1})$$

(Formula 15)

The term of the order n=2 of the equation 15 would have been obtained, according to the previous embodiment, to take into account the addition of speed produced by the free fall of the grain. This term would not be necessary if the speed of the flow on the scale could be measured directly, as is proposed in the second embodiment.

Therefore, and in order to replace (formula 15) of the first embodiment, the below formula is added, obtained to measure the speed of the grain stream or flow in said weighing device 11 and more precisely to measure the flow speed that runs through the load cell 7 that is part of the first embodiment. The formula of the present embodiment replaces (formula 15) of the first embodiment and is expressed below, wherein:

$$M = k \sum_{i=0} f(t_i) \cdot \Delta m_{Balanza}(t_i) + f(t_{i-1}) \cdot \Delta m_{Balanza}(t_{i-1})$$

(Replacement formula)

Exactly as for the previous embodiment, an example is taken of a typical case with a silage bag extractor that contains a worm screw. As a result, the rotation frequency or speed of the screw or delivery member is f=320 rpm; the exit speed of the grain is v=2 m/s; and the exit mass flow of the grain is $q_m$=50 Kg/s. Therefore, on a plate of 800 mm long, there will be a presence of approximately 19 Kg. of grains G on the weighing plate 9, as a result of which it will be convenient to mount a weighing plate 9 with a total weighing value of approximately 30 Kg.

Measuring of the Total Mass after an Unloading Period of Time

The present embodiment uses an alternative rotation member such as the paddle wheel 18. In other words, in the first embodiment, the rotation member is preferably said worm screw, but in the current embodiment, the rotation sensor member 14 is positioned to detect the paddle wheel 18, which is preferably situated at the exit of the mouth 15, and consequently the rotation sensor member 14 detects the revolutions, turns or rotations of the paddle 18. Said paddle wheel turns or rotates as the continuous stream or flow of grains, seeds or the like pass by it. In conclusion, when the stream or flow of bulk material passes over the upper movable plate 9, delivered by said worm screw (not illustrated), the plate defines a longitudinal passage of the flow of bulk material. Said flow is also improved by the soft transition of said upper movable plate 9 and said intermediate panel 23, and said passage includes a projecting portion 25 of the paddle wheel 18. Said projecting portion, for the purpose of the present embodiment, is preferably a portion of the blades or paddles 19. Also, it should be noted that said paddle wheel and said flow of bulk material are directly related with regards to rotation.

Consequently, as the continuous stream or flow of grain passes through said weighing device 11, the grain makes the paddle wheel turn because of the delivery speed provided by said worm screw and the rotation of said paddle wheel is detected by the transducer 14, which reads the rotation speed of the axis of said paddle wheel and transmits the signal to the data processing circuit 16 for storage and processing of the data. This circuit requests the information from said transducer 14 and the load cell 7 and combines the data in said formula that corresponds to the current invention, to obtain the mass quantity that is passing through said weighing device 11, obtaining the total unloaded weight or loaded into a silage bag or loading truck.

The second embodiment increases the reading precision of the unloaded stream by said weighing device, as in the first embodiment, the sensor member, being assembled in order to measure the speed of the screw, had a greater percentage of precision loss, but by mounting the sensor member 14 directly onto a paddle wheel 19 that measures the rotation speed of the grain flow that is found at the exit mouth 15, said reading precision is increased. Even when the disposition of the rotating reference members has demonstrated effective operation in the illustrated transversal positions, for example at the exit of the device 3, as in the case of the paddle wheel 18, it has also been proven that the parameter speed of the grain can be measured using a vertically placed paddle wheel, for example at a side of the tubular weighing frame.

In conclusion, the improvements of the second embodiment represent a more reliable and practical development, as both the first and second embodiment prove the practical versatility, as well as the time and costs that are saved during the weighing process. Said costs include large scales for weighing the truck that carries the load, the loading and unloading time is increased, which is important and valuable for the agrarian user. Nonetheless, this problem is aided and resolved by the second embodiment which has a weighing device for bulk material during the unloading/loading. Said device is compact, easily usable and has great practical benefits for the agrarian user, said device is placed in the output of a continuous loading/unloading tube for bulk material, and said device also avoids the need for alteration or modification of the loading and unloading machines for bulk material.

Even though the embodiments of the present invention as described above have shown to be a notable advance compared to the weighing devices in the prior art, it has been found that in certain conditions, the grains appear in a waved stream which jeopardizes their correct weighing, and therefore the inventors have developed improvements that form part of a third embodiment which is described below.

Description of the Third Embodiment

As has been stated before, even though the first and second embodiments present the different advantage as mentioned, it has been observed that in some machines and elevating constructions for grain, the grain elevation screw reaches the outlet mouth close to the edge of the tube, generating two effects: the first is that the grains are projected in the wrong direction, falling into the wrong area of the scale plate, causing this grain to stay more or less time on the plate and inducing a measurement error, which will depend on the rotations of the screw. The second effect is related to the generation of a wave of the grain flow, which generates instabilities of the measurement and increases the error margin.

Said inconveniences are solved by the third embodiment, which in turn also transports the grain onto the weighing plate of the scale, compactly and uniformly, and independently from the revolutions of the elevation screw.

Figure 7:
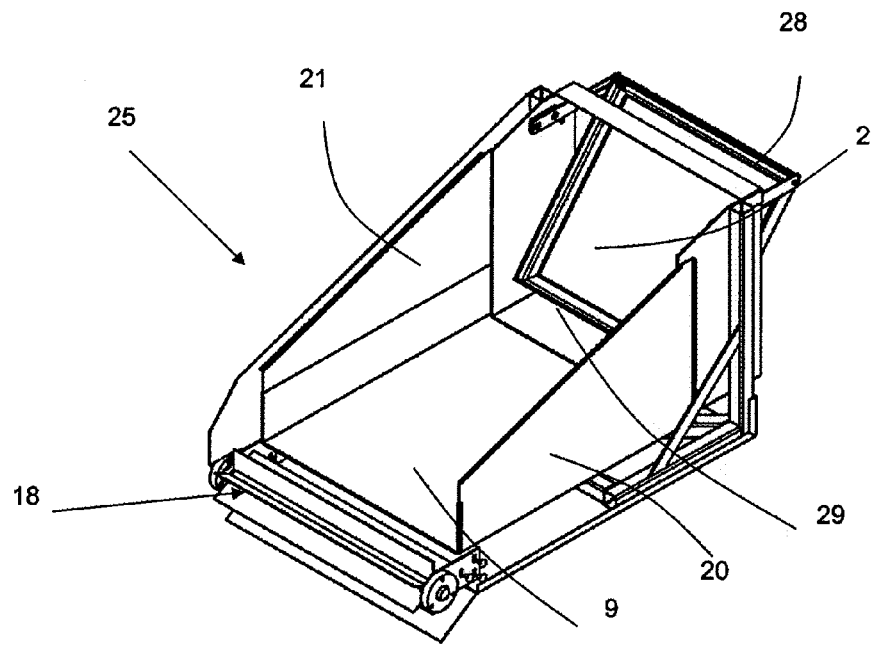
FIG. 7 shows a partial perspective cross section view of the device according to a third embodiment of the present invention, wherein the addition of a deflector plate can be observed, with the deflector plate being shown in a rest position, arranged between the two side plates of the header or spout.
Figure 8:
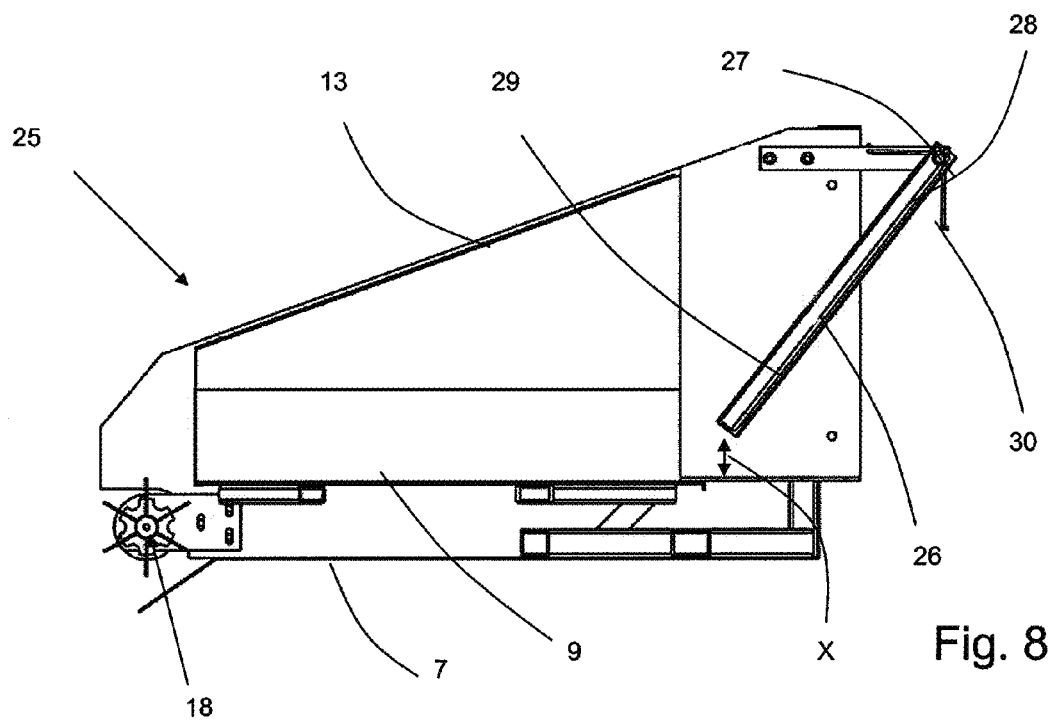
FIG. 8 shows a partial lateral cross section view, according to the third embodiment of the present invention, wherein said deflector plate is shown in the resting position, pivotally mounted to oscillate around a shaft under the load of a torsion spring.

In FIGS. 7 and 8, which illustrate the third embodiment of the invention, the same reference numbers have been used as in FIGS. 1 to 6 to indicate the same common parts, and new reference numbers have been used for new parts that make up the third embodiment.

Figure 9:
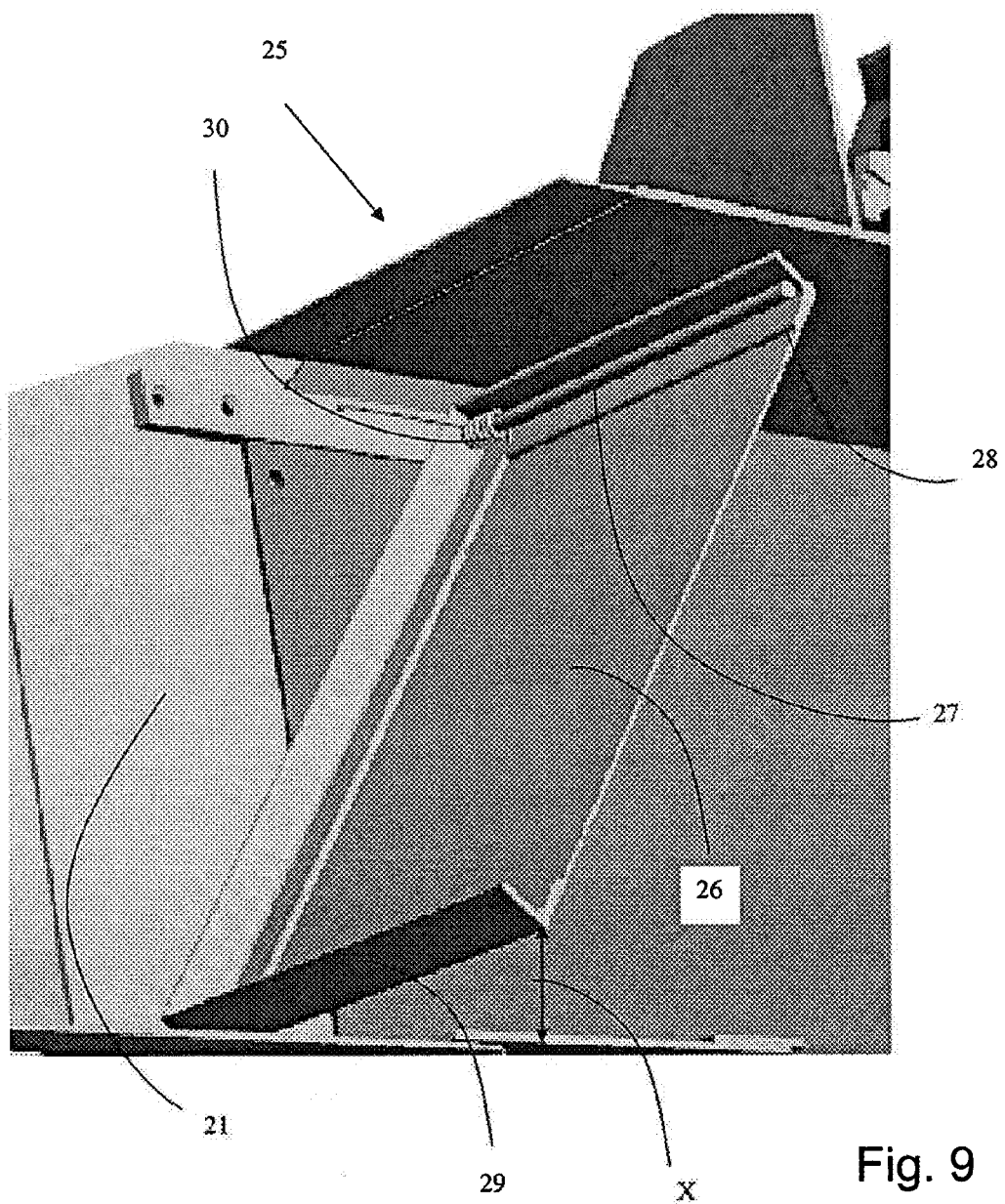
FIG. 9 shows a partial perspective cross section view of the weighing device according to the third embodiment of the present invention, wherein said deflector plate is shown mounted onto a shaft and the torsion spring is arranged in said shaft.

In agreement with FIGS. 7, 8 and 9 that show the third embodiment, a weigher device 25 is observed comprising the upper movable plate 13 and two side plates 20 and 21 that, together with the upper movable plate 9 and the stationary bottom plate 7, define a frame through which the flow of bulk material circulates, in the same way as has been described in the previous embodiments. To counter the previously mentioned inconveniencies, the third embodiment, unlike the previous embodiments, has a deflector plate 26, pivotably mounted on an axis 27 that defines a rotation axis, which is located parallel to the upper movable plate 13 and has one end mounted on the lateral plate 20 and the opposite end mounted on the opposite lateral plate 21 of said weighing device 25.

Said deflector plate 26 has an upper edge 28 connected to said shaft 27, so it can pivot or oscillate around it. Between axis 27 and the upper edge 28, at least one spring 30 is placed, or two springs on each end of the axis, for example torsion springs, close to the lateral plate 21, which generates a force that is directed towards the bottom edge 29 of the deflector plate 26 so it remains close to the upper movable plate 9 and at a height X above said plate 9. Even though said shaft 27 is physically represented in FIGS. 8 and 9, it can be left out, by articulating the extremities of the upper edge 28 of the deflector plate, for example by using projecting bolts on both side plates 20 and 21.

As a consequence of said disposition of the deflector plate, the speed of the bulk material flow is extenuated at the exit of the unloading tube, not illustrated in FIGS. 7, 8 and 9 but sufficiently illustrated in FIGS. 1 through 6, causing said flow of bulk material to continuously and constantly impact on the center of the upper movable plate 9, obtaining a much more exact and dynamic weighing measurement. Said height X will remain defined in function of the typology of the bulk material as well as the rotation speed of the worm screw. The actuation of the deflector plate may be understood as a combing, or regulating effect of the flow of the bulk material, such as the grain, to guarantee that the grain passes over the movable plate in the most uniform manner possible, thus preventing the formation of waves in the flow.

It should remain clear that each and every one of the characteristics illustrated in the three embodiments can be combined among themselves, for example; the header that is closed from above in FIGS. 6 and 8, can be present in the header of the rest of the figures although they have not been illustrated as such for reason of clarity of the drawings.

I claim:

1. A weighing device for a bulk material conveyor, the weighing device being arranged in a location where bulk material is flowing comprising:
    a bottom plate stationary relative to said bulk material conveyor,
    an upper movable plate disposed above said bottom plate whereby the bulk material flows on the upper movable plate,
    at least one load cell connected to said bottom plate and to said upper movable plate,
    a rotating reference member for contact with bulk material flow;
    a sensor member operatively connected to the rotating reference member;
    a data processing circuit operatively connected to said at least one load cell and to said sensor member, and
    a deflector plate at an entrance towards the upper movable plate with the deflector plate having an upper edge hinged to a rotation axis and a bottom edge positioned close to and above the upper movable plate.

2. A weighing device for a bulk material conveyor according to claim 1, wherein said weighing device is arranged at an output of a tube of the bulk material conveyor, and said rotating reference member is selected from the group consisting of a worm screw in the interior of said tube, a rotor with rotating radial blades, a paddle wheel, and combinations thereof.

3. A weighing device for a bulk material conveyor according to claim 2, wherein said sensor member detects rotation of the rotating reference member caused by flow of bulk material, and is a rotary transducer operatively connected to at least one of the following: said paddle wheel, said worm screw, said rotor with rotating radial blades and combinations thereof.

4. A weighing device for a bulk material conveyor according to claim 1, further comprising at least one spacer arranged between said stationary bottom plate and said upper movable plate without interfering with the movement of the upper movable plate transferring weight to said at least one load cell.

5. A weighing device for a bulk material conveyor according to claim 1, further comprising a header closed from above by a closing plate.

6. A weighing device for a bulk material conveyor according to claim 1, wherein said upper movable plate has at least one flat portion.

7. A weighing device for a bulk material conveyor according to claim 1, wherein said upper movable plate has at least one curved portion.

8. A weighing device for a bulk material conveyor according to claim 7, wherein said rotating reference member is said rotor with rotating radial blades which are spaced apart and said rotor has a rotary shaft, and said curved portion extends concentrically to the rotary shaft and at least along the space between two adjacent blades.

9. A weighing device for a bulk material conveyor according to claim 2, further comprising a longitudinal axis and a discharge output, and wherein said rotating reference member is said paddle wheel and is arranged close to the discharge output and said sensor member is operatively connected to said paddle wheel, and wherein the paddle wheel extends transversely to said longitudinal axis, said paddle wheel being adjacent to said upper movable plate which defines a path for the flow of bulk material being unloaded and said paddle wheel has a plurality of paddles extending through said path for the flow of bulk material and for rotating according to the flow of the bulk material.

10. A weighing device for a bulk material conveyor according to claim 9, wherein said paddle wheel has a shaft.

11. A weighing device for a bulk material conveyor according to claim 10, wherein said shaft of said paddle wheel has one end mounted on a side plate and an opposite end mounted on an opposite side plate, the two side plates and the bottom plate forming a body of the weighing device.

12. A weighing device for a bulk material conveyor according to claim 11, wherein said upper movable plate and said paddle wheel are separated by an intermediate panel, wherein said upper movable plate and said intermediate panel define said path for the flow of bulk material.

13. A weighing device for a bulk material conveyor according to claim 12, wherein said paddle wheel is made from a metallic material.

14. A weighing device for a bulk material conveyor according to claim 1, wherein said rotation axis has an end mounted on a side plate arranged at each side of the upper movable plate.

15. A weighing device for a bulk material conveyor according to claim 14, wherein said deflector plate has a spring between said upper edge of the deflector plate and said rotation axis.

16. A weighing device for a bulk material conveyor according to claim 1 wherein said load cell measures weight of material on said upper movable plate and said rotating reference member and sensor measures the rate of flow of material over the upper movable plate, said weight and said rate being communicated to said data processing circuit.

17. A weighing device for a bulk material conveyor according to claim 16, wherein said data processing circuit processes said weight and said rate information to calculate the Total Mass of the Flowing Material (M) in accordance with:

$$M = \sum_{n=0}^{2} k_n \cdot \sum_{i=0}^{} f(t_i)^n \cdot \Delta m_{Balanza}(t_i) + f(t_{i-1})^n \cdot \Delta m_{Balanza}(t_{i-1})$$

(Formula 15)

where;
$k_n$=three adjustable calibration constants;
f=rotations per minute of the rotating reference member; and
$\Delta m$=the weight sensed by said load cell for each converted analog to digital signal at a sensing time "i".

18. A dynamic weighing device for a bulk material conveyor, the weighing device being arranged in a location where bulk material is flowing, for continuously weighing material in real time, comprising:
(a) a pair of spaced side plates which are connectible to said bulk material conveyor;
(b) a bottom plate stationary relative to said bulk material conveyor;
(c) an upper movable plate disposed above said bottom plate whereby the bulk material flows on the upper movable plate;
(d) at least one load cell connected to said bottom plate and to said upper movable plate;
(e) a rotating reference member for contact with bulk material flow;
(f) a sensor member operatively connected to the rotating reference member,
(g) a data processing circuit operatively connected to said at least one load cell and to said sensor member, and
(h) a deflector plate at an entrance towards the upper movable plate with the deflector plate having an upper edge hinged to a rotation axis and a bottom edge positioned close to and above the upper movable plate.

19. A dynamic weighing device for a bulk material conveyor, the weighing device being arranged in a location where bulk material is flowing, for continuously weighing material in real time, comprising:
(a) a pair of spaced side plates which are connectible to said bulk material conveyor;
(b) a bottom plate stationary relative to said bulk material conveyor;
(c) an upper movable plate disposed above said bottom plate whereby the bulk material flows on the upper movable plate;
(d) a deflector plate mounted near the entrance of the upper movable plate for controlling the direction of the flowing bulk material and for minimizing wave behavior of the flowing bulk material;
(e) at least one load cell connected to said bottom plate and to said upper movable plate, said load cell measuring weight of material on the upper movable plate;
(f) a rotating reference member for contact with bulk material flow;
(g) a sensor member operatively connected to the rotating reference member, whereby said sensor and rotating reference member measure the rate of material flowing over the upper movable plate; and
(h) a data processing circuit operatively connected to said at least one load cell and to said sensor member for determining the total mass of material output from the conveyor based on the weight of material on the upper movable plate at one or more sensing times and the rate of flow of material.

* * * * *